(12) United States Patent
Eriksen

(10) Patent No.: US 7,278,446 B2
(45) Date of Patent: Oct. 9, 2007

(54) MIXING FAUCET

(75) Inventor: Torben Eriksen, Vissenbjerg (DK)

(73) Assignee: Damixa ApS, Odense No (DK)

( * ) Notice: Subject to any disclaimer, the term of this patent is extended or adjusted under 35 U.S.C. 154(b) by 224 days.

(21) Appl. No.: 10/547,910

(22) PCT Filed: Mar. 4, 2004

(86) PCT No.: PCT/DK2004/000143

§ 371 (c)(1),
(2), (4) Date: Sep. 8, 2005

(87) PCT Pub. No.: WO2004/081432

PCT Pub. Date: Sep. 23, 2004

(65) Prior Publication Data

US 2006/0180212 A1    Aug. 17, 2006

(30) Foreign Application Priority Data

Mar. 12, 2003  (DK) ............................ 2003 00082 U

(51) Int. Cl.
*F16K 11/20* (2006.01)
*F16K 31/60* (2006.01)

(52) U.S. Cl. ....................................... 137/606; 251/233

(58) Field of Classification Search ............... 137/606; 251/233, 251

See application file for complete search history.

(56) References Cited

U.S. PATENT DOCUMENTS

| | | | | |
|---|---|---|---|---|
| 3,575,378 | A * | 4/1971 | Fawkes ....................... 251/229 |
| 4,185,659 | A * | 1/1980 | Bernat ..................... 137/625.17 |
| 4,815,703 | A * | 3/1989 | Antoniello ................... 251/251 |
| 6,220,266 | B1 * | 4/2001 | Hennessy ....................... 137/1 |
| 6,341,617 | B1 * | 1/2002 | Wilson .................... 137/119.04 |
| 7,104,280 | B2 * | 9/2006 | Eriksen ....................... 137/606 |

FOREIGN PATENT DOCUMENTS

| EP | 0426587 | * | 5/1991 |
|---|---|---|---|
| GB | 2227549 | * | 8/1990 |

* cited by examiner

*Primary Examiner*—Stephen M. Hepperle
(74) *Attorney, Agent, or Firm*—Cooper & Dunham LLP

(57) ABSTRACT

A mixing faucet includes a body part (2), where a rotatable swivel tap (4) is mounted on said body part, and where a rotatable valve spindle (6) is mounted in said body part for an adjustment of the feeding of cold and hot water, respectively. The rotatable valve spindle (6) is according to the invention equipped with a projecting arm (8) engaging a groove in a slide (10) on the side of the body part (2). The resulting mixing faucet is much easier to handle than hitherto known.

3 Claims, 5 Drawing Sheets

MIXING FAUCET

TECHNICAL FIELD

The present invention deals with a mixing faucet including a body part, where a rotatable swivel tap is mounted on said body part and a rotatable valve spindle is mounted in said body part for an adjustment of the feeding of cold water and a rotatable valve spindle for the adjustment of the feeding of hot water.

BACKGROUND ART

Mixing faucets are known which include a rotary handle for activating the rotatable valve spindles for the adjustment of the feeding of cold and hot water, respectively.

However, such rotary handles should be avoided for the sake of the design.

DISCLOSURE OF INVENTION

The object of the invention is to provide a mixing faucet allowing the adjustment of the feeding of the cold and the hot water, respectively, to be carried out by means of a slide.

The new features of the invention are found in each rotatable valve spindle being equipped with a projecting arm engaging a slide which is arranged on the side of the body part of the mixing faucet, where a projecting member is provided on the body part, the slide being displaceable on said projecting member, and where a sleeve is provided at the end of the projecting member in such a manner that a bar connected to the slide can be displaced in said sleeve.

As a result, a mixing faucet with slides with a flat look is obtained. In addition it is ensured that each slide is prevented from wriggling during a forward and backward movement. Furthermore, a mixing faucet is obtained which is highly suited for handicapped persons.

BRIEF DESCRIPTION OF THE DRAWINGS

The invention is explained in detail below with reference to the drawings, in which.

BEST MODE FOR CARRY OUT THE INVENTION

Figure 1:
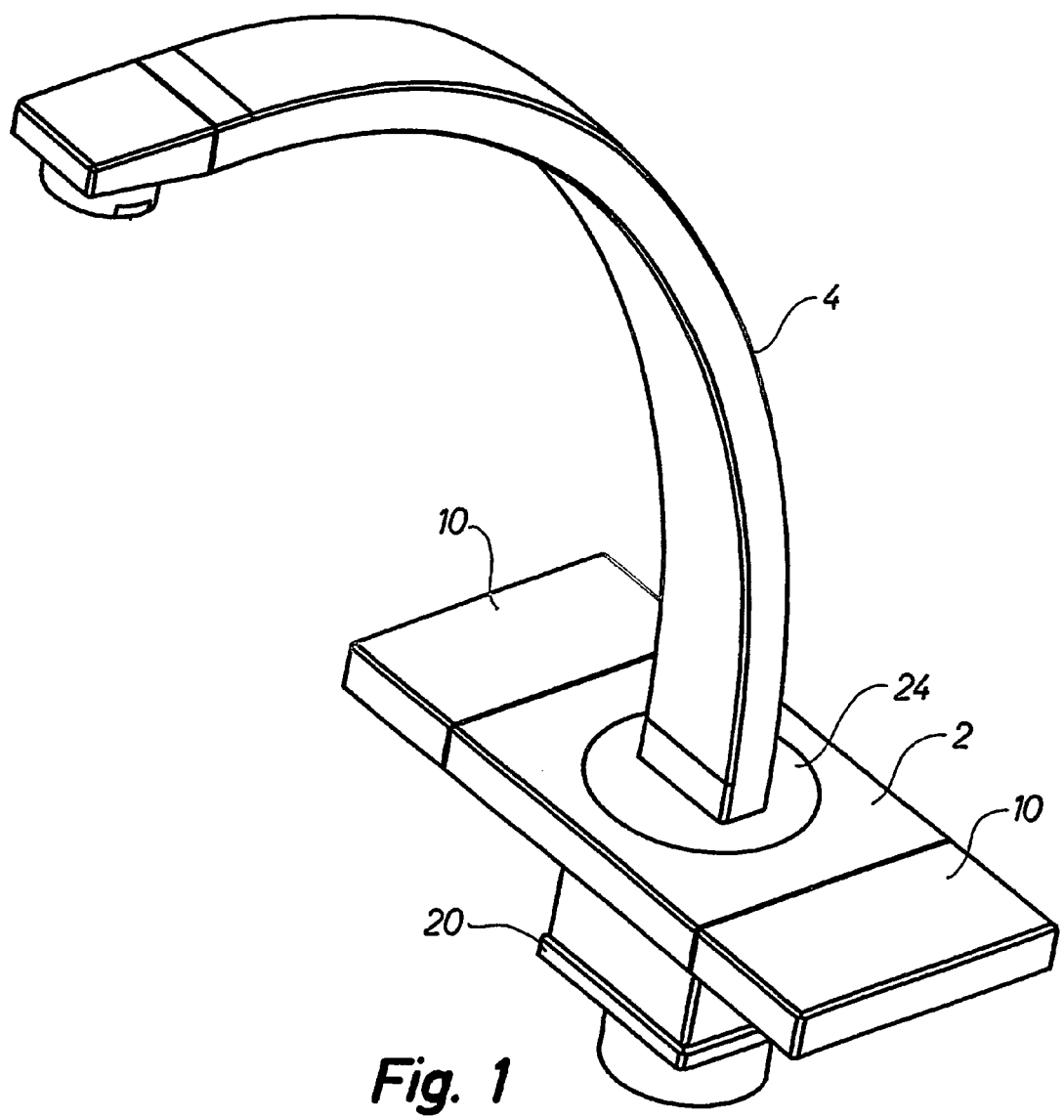
FIG. 1 shows a mixing faucet according to the invention, said mixing faucet including a body part with a swivel tap and an adjusting slide on both sides of said body part.
Figure 2:
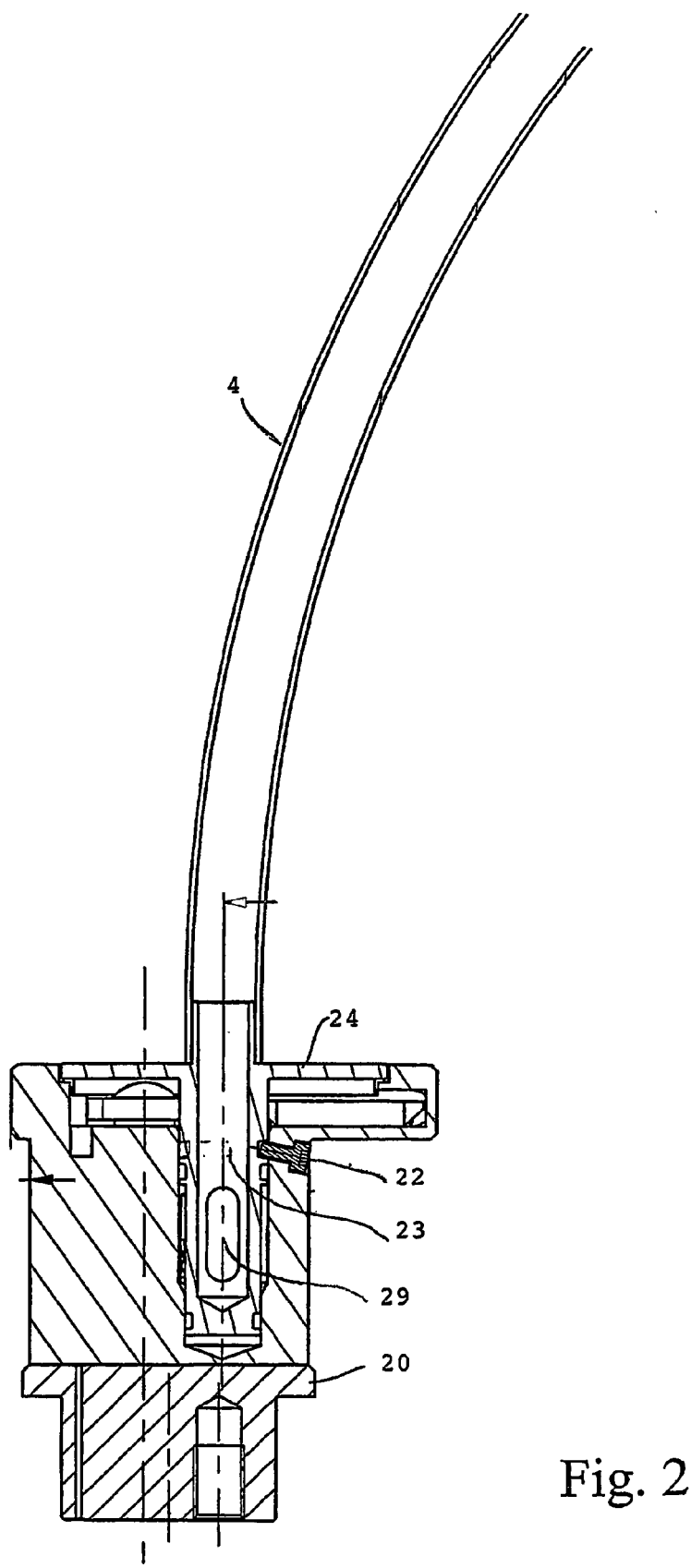
FIG. 2 is a sectional view of the mixing faucet of FIG. 1, and showing how the rotatable swivel tap is secured to the body part.
Figure 4:
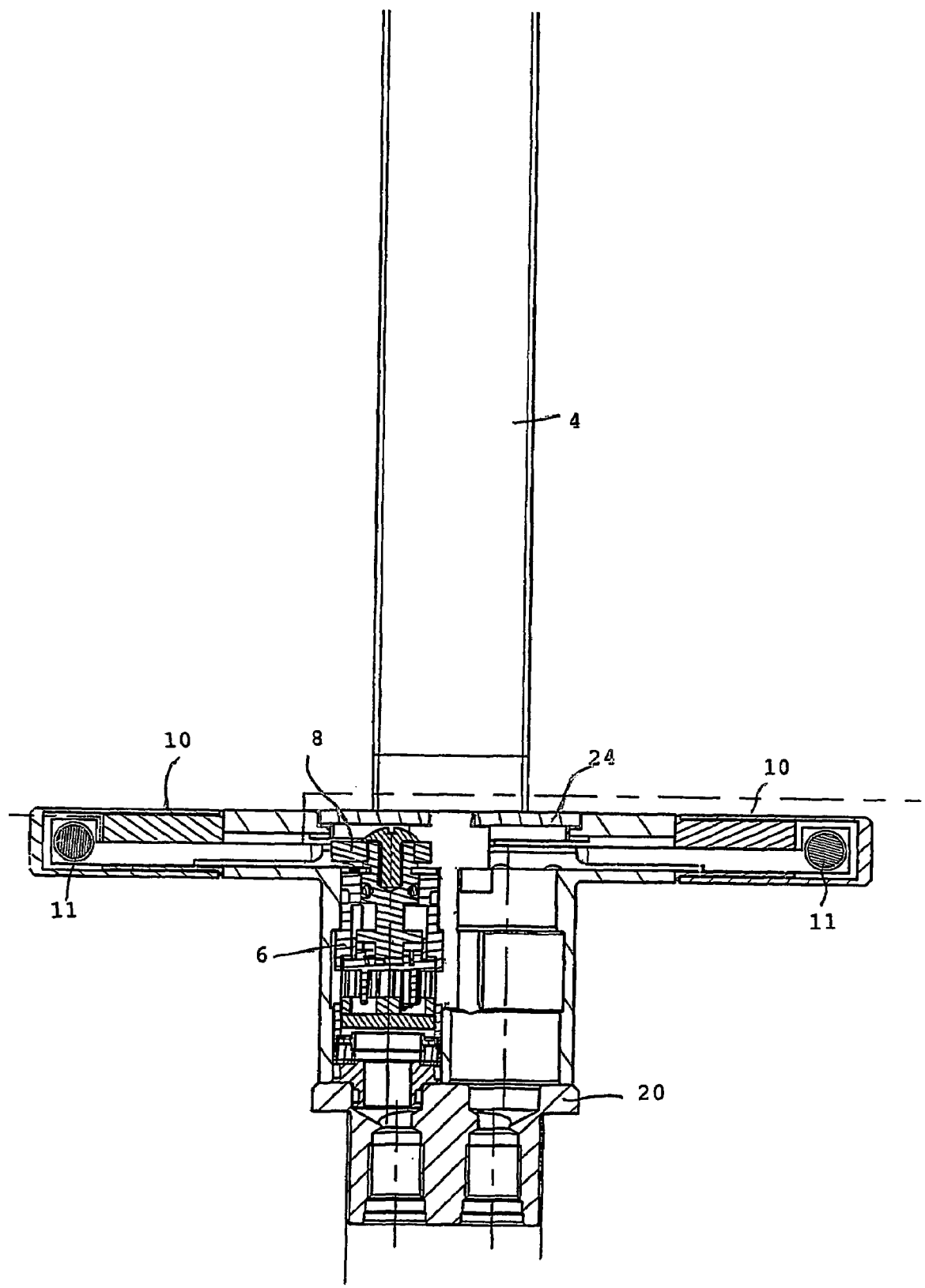
FIG. 4 is a sectional front view of the mixing faucet of FIG. 1.
Figure 5:
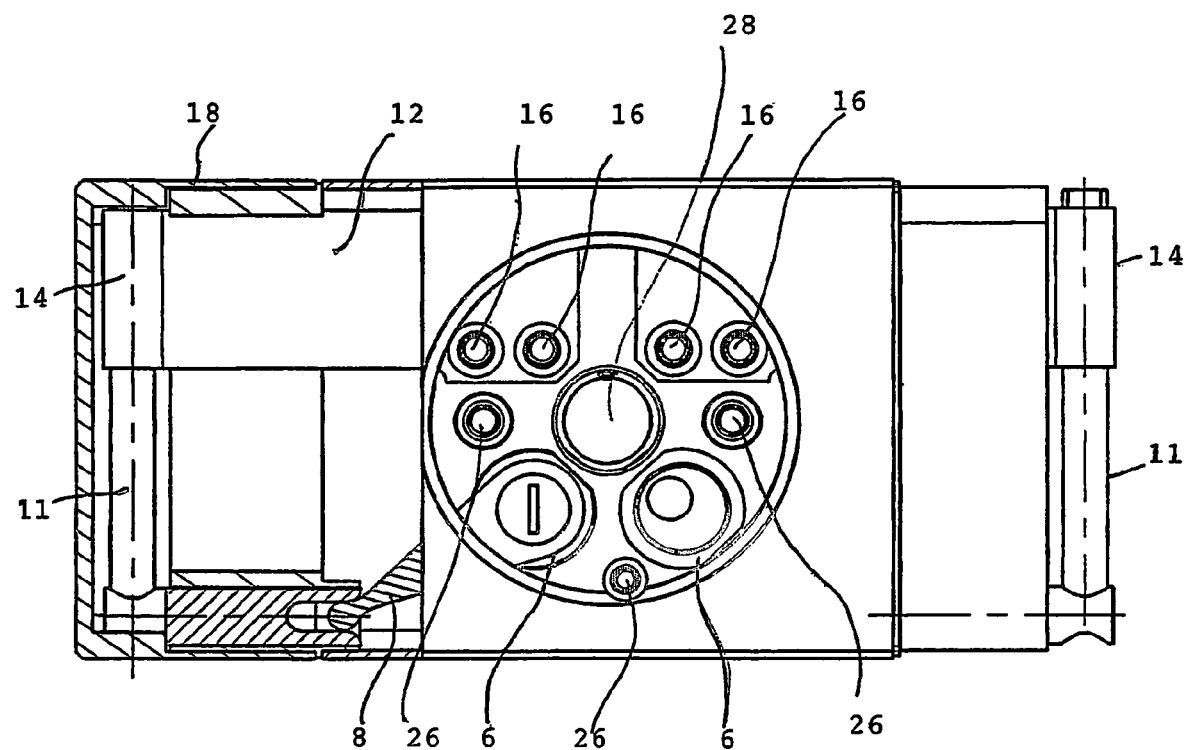
FIG. 5 is a top view of the mixing faucet of FIG. 1 where the swivel tap has been dismounted.

The mixing faucet of FIG. 1 according to the invention includes a body part 2 and a rotatable swivel tap 4 mounted on said body part 2. As shown in FIGS. 4 and 5, a rotatable valve spindle 6 is mounted in the body part 2, said valve spindle being adapted to adjust the feeding of cold water, in addition to a valve spindle adapted to adjust the feeding of hot water. In order to achieve the flat look shown in FIG. 1, each valve spindle 6 is equipped with a projecting arm 8, cf. FIG. 5. The valve spindle 6 extends through a side opening in the body part 2 and engages a slide 10 movable on the side of said body part 2 and flushing with the plane upper face of said body part 2. Each slide 10 is provided with an elongated opening, and a projecting member 12 is secured to the body part 2 and extends through said elongated opening in the slide 10 in such a manner that said slide 10 can be moved forwards and backwards. An expanded portion is found at the end of the projecting member 12, said expanded portion being in form of a sleeve 14 allowing a bar 11 secured to the slide 10 to be displaced therein so as to prevent the slide 10 from wriggling. Like the slide 10, the projecting member 12 is preferably made of brass.

The slide 10 is surrounded by a cover structure hiding the slide mechanism. It should be noted that the slide mechanism can be structured in other ways, such as by means of a rack work mechanism or an articulated rod mechanism.

The projecting members 12 are secured to the body part 2 by means of screws 16 in a countersunk portion of the body part 2. This countersunk portion is covered by a cover member.

The body part 2 is furthermore provided with cavities allowing insertion of the valve spindles 6, preferably from the bottom, with the result that a bottom section 20 can be screwed thereon, cf. FIGS. 4 and 5, by means of through screws 26 shown in the countersunk portion of the body part 2. In addition, the projecting arms 8 can be screwed onto the upper portion of the valve spindles 6, said projecting arms 8 extending through side openings in the body part 2 so as to engage slots in the movable slides 10. The valve spindles 6 are furthermore structured such that they can only be inserted while they are in a specific angular position relative to the cavities in the body part 2, and furthermore such that the change from an open into a closed position only requires a turning of approximately 90°. The mixing faucet according to the invention is highly advantageous in requiring nothing but ordinary valve spindles.

When the projecting arms 8 have been secured to the valve spindles 6 by means of a screw in the countersunk portion of the body part 2, the swivel tap 4 is moved downwards into a central opening 28 in the countersunk portion of the body part 2. The swivel tap is moved so far downwards into the opening 28 that it cannot wriggle. The swivel tap 4 includes a circumferential groove 23 with the result that it can be retained by means of a holding screw 22 inserted in said groove 23 at the same time as it is rotatably arranged. A circular cover member 24 is secured to the swivel tap 4, said cover member 24 covering the relatively large opening to the countersunk portion of the body part 2 and consequently all the securing screws. The cover member 24 rotates together with the swivel tap 4 and has been sealed by means of a durable plastic gasket.

Figure 3:
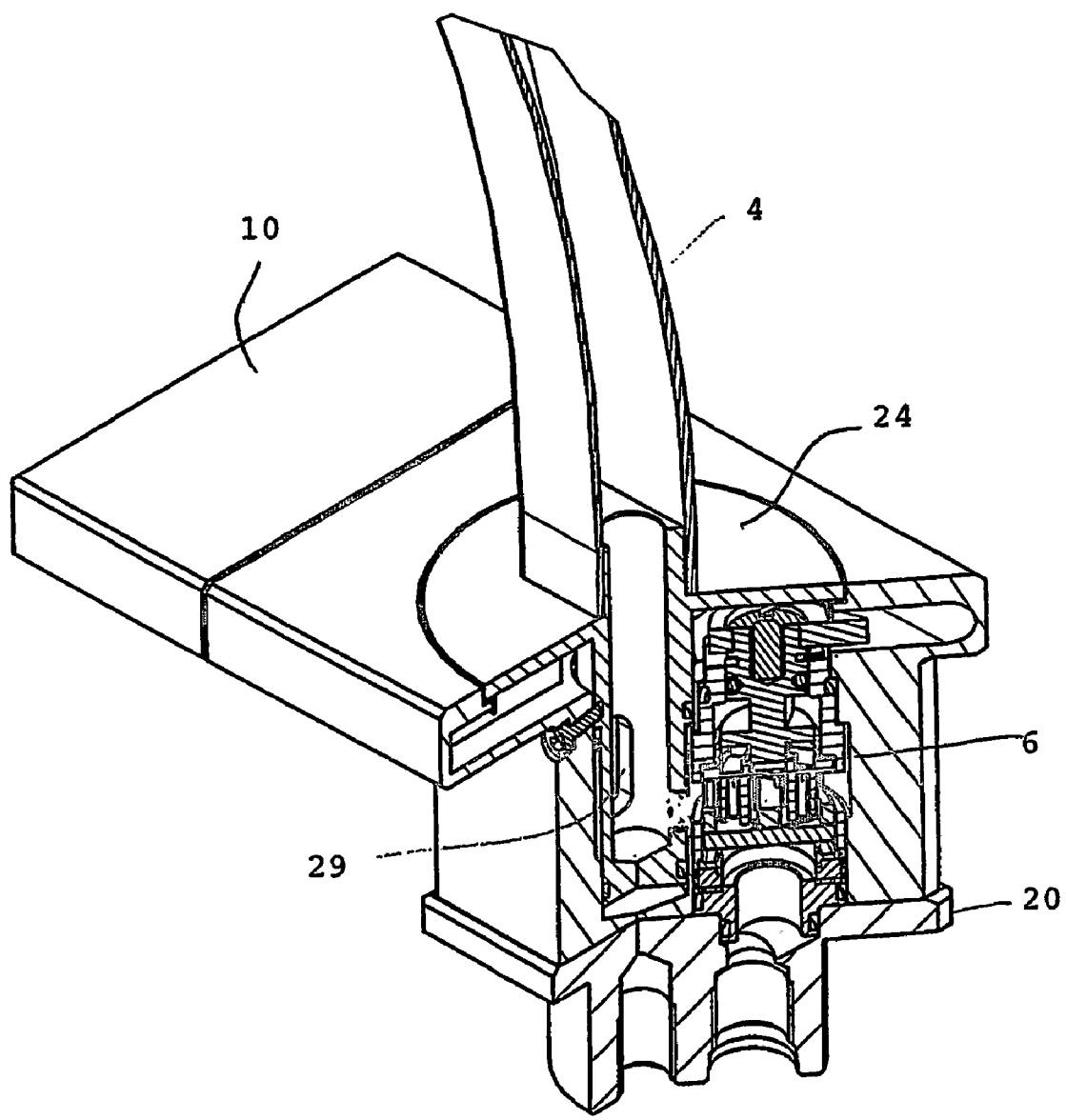
FIG. 3 shows the mixing faucet of FIG. 1 where some parts have been removed with the result that a sectional view is shown of one of the rotatable valve spindles in the body part for adjustment of the feeding of either cold or hot water.

FIG. 3 shows some side openings 29 in the portion of the swivel tap 4 being inserted in the body part 2. These side openings 29 communicate with a circumferential cavity surrounding the swivel tap 4, said cavity in turn communicating with the outlet openings of the valve spindles.

The entire mixing faucet can for instance be secured to a table-top by means of a bench screw at the bottom.

The invention claimed is:

1. A mixing faucet including a body part (2), where a rotatable swivel tap (4) is mounted on said body part, and where a rotatable valve spindle (6) is mounted in said body part (2) for an adjustment of the feeding of hot water in addition to a rotatable valve spindle (6) for an adjustment of the feeding of hot water, characterised in that the rotatable valve spindle (6) is equipped with a projecting arm (8) engaging a slide (10) arranged on the side of the body part (2), that a projecting member (12) is provided on the body part (2), the slide (10) being displaceable on said projecting member, and that a sleeve (14) is provided at the end of the projecting member (12), a bar (11) connected to the slide (10) being displaceable in said sleeve (14).

2. A mixing faucet according to claim 1, characterised by downwardly open cavities being provided in the body part (2) for the insertion of the valve spindles (6), whereafter a bottom section (20) can be secured, said bottom section allowing feeding of cold and hot water, respectively.

3. A mixing faucet according to claim 2, characterized by the valve spindles (6) and the mating cavities in the body part (2) being structured such that said valve spindles (6) can only be inserted while in a specific angular position relative to said cavities.

\* \* \* \* \*